United States Patent
Ghatpande et al.

(10) Patent No.: US 11,929,883 B1
(45) Date of Patent: Mar. 12, 2024

(54) SUPPORTING VIRTUAL MACHINE MIGRATION WHEN NETWORK MANAGER OR CENTRAL CONTROLLER IS UNAVAILABLE

(71) Applicant: VMware, Inc., Palo Alto, CA (US)

(72) Inventors: Rushikesh Shashank Ghatpande, Sunnyvale, CA (US); Nilesh Ramchandra Nipane, Foster City, CA (US); Nikhil Ravindra Rajguru, San Jose, CA (US); Lele Zhang Zlele, Beijing (CN)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/935,339

(22) Filed: Sep. 26, 2022

(51) Int. Cl.
*G06F 15/173* (2006.01)
*H04L 41/122* (2022.01)

(52) U.S. Cl.
CPC .................. *H04L 41/122* (2022.05)

(58) Field of Classification Search
CPC .......... H04L 41/122; H04L 41/0897
See application file for complete search history.

(56) References Cited

U.S. PATENT DOCUMENTS

| | | | |
|---|---|---|---|
| 8,639,783 B1 * | 1/2014 | Bakke | H04L 41/0897 710/316 |
| 10,637,803 B2 | 4/2020 | Lambeth et al. | |
| 2015/0372854 A1 * | 12/2015 | Furukawa | G06F 9/45558 709/223 |
| 2016/0028658 A1 * | 1/2016 | Lambeth | G06F 9/45558 718/1 |

OTHER PUBLICATIONS

"NSX Administration Guide" VMware Nsx Data Center for vSphere 6.4, Update 17, Modified on Aug. 25, 2022.

* cited by examiner

*Primary Examiner* — Wing F Chan
*Assistant Examiner* — Joseph R Maniwang
(74) *Attorney, Agent, or Firm* — King Intellectual Asset Management (57) ABSTRACT

The disclosure provides an approach for virtual computing instance (VCI) migration. Embodiments include scanning logical segments associated with a customer gateway to identify network addresses associated with the logical segments. Embodiments include determining one or more recommended supernets based on the network addresses associated with the logical segments. Embodiments include providing output to a user based on the one or more recommended supernets. Embodiments include based on the output, receiving input from the user configuring an aggregation supernet for the customer gateway. Embodiments include advertising the aggregation supernet to one or more endpoints separate from the customer gateway.

20 Claims, 5 Drawing Sheets

SUPPORTING VIRTUAL MACHINE MIGRATION WHEN NETWORK MANAGER OR CENTRAL CONTROLLER IS UNAVAILABLE

BACKGROUND

Software defined networking (SDN) involves a plurality of hosts in communication over a physical network infrastructure of a data center (e.g., an on-premise data center or a cloud data center). The physical network to which the plurality of physical hosts are connected may be referred to as an underlay network. Each host has one or more virtualized endpoints such as virtual machines (VMs), containers, Docker containers, data compute nodes, isolated user space instances, namespace containers, or other virtual computing instances (VCIs). The VMs running on the hosts may communicate with each other using an overlay network established by hosts using a tunneling protocol. Though certain aspects are discussed herein with respect to VMs, it should be noted that the techniques may apply to other suitable VCIs as well.

As part of an SDN, any arbitrary set of VMs in a datacenter may be placed in communication across a logical Layer 2 network by connecting them to a logical switch. A logical layer 2 network is decoupled from the physical network in some way, such as by encapsulation using an overlay network or by address translation. A logical switch is collectively implemented by at least one virtual switch on each host that has a VM connected to the logical switch. Virtual switches provide packet forwarding and networking capabilities to VMs running on the host. The virtual switch on each host operates as a managed edge switch implemented in software by the hypervisor on each host. Logical switches comprise a set of logical ports, which provide logical connection points to various types of destinations, such as logical switches, logical routers, and external networks. Each logical port corresponds to a virtual port (vports), which provide queuing and forwarding functions for virtual switches. A particular logical switch may comprise logical ports mapped to virtual ports distributed across a number of virtual switches and a number of physical hosts. VCIs are generally connected to logical switches via logical ports to enable communications to and from the VCIs.

VCIs may be migrated between hosts for a variety of purposes, such as load balancing, fault tolerance, and/or to place a host in maintenance mode. When a VCI that is connected to a logical port is migrated from a source host to a destination host, the VCI generally remains connected to the same logical port, but a virtual switch on the destination host will implement the migrated logical port. A network management component (network manager) and/or central controller associated with the network management component are generally involved in the process of VCI migration to ensure that network connectivity is maintained across the migration.

However, there are cases when the network manager and/or central controller are unavailable, such as to due to a hardware, software, or connectivity failure. In such cases, migration of VCIs cannot be successfully completed using existing techniques, as the network manager and/or central controller are unable to perform their role in the process. Without the ability to migrate VCIs, various issues may arise, such as the inability to place a host in maintenance mode.

DETAILED DESCRIPTION

The present disclosure provides an approach for enabling migration of virtual computing instances (VCIs) between hosts when a network manager or central controller is unavailable. In certain embodiments, the network manager and/or central controller optionally provides pre-migration and post-migration functionality when the network manager and/or central controller are available. Furthermore, port information relating to logical ports that is maintained by the network manager and/or central controller may be provided to a virtualization manager, and stored in a cache at the virtualization manager for use in migrating VCIs when the network manager and/or central controller are unavailable. Thus, in cases where the network manager and/or central controller are unavailable, the involvement of the network manager and/or central controller may be postponed until the network manager and/or central controller again become available, and VCIs can still be successfully migrated between hosts through the use of the port information stored in the cache at the virtualization manager.

Figure 1:
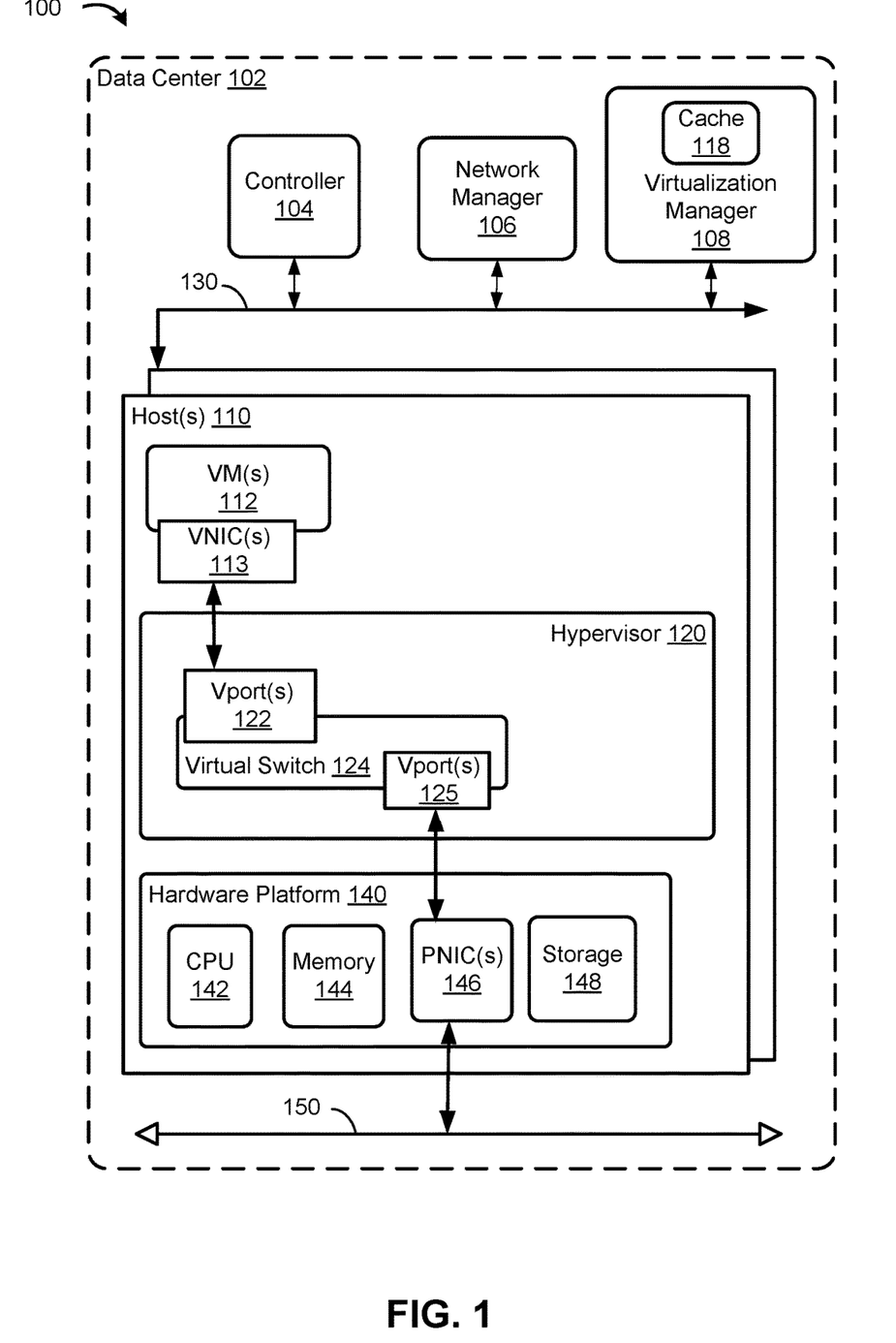
FIG. 1 depicts a block diagram of a data center, according to one or more embodiments.

FIG. 1 depicts example physical and virtual network components in a networking environment 100 in which embodiments of the present disclosure may be implemented. Networking environment 100 includes a data center 102, which includes one or more hosts 110, a management network 130, a data network 150, a controller 104, a network manager 106, and a virtualization manager 108. Data network 150 and management network 130 may be implemented as separate physical networks or as separate virtual local area networks (VLANs) on the same physical network.

Host(s) 110 may be communicatively connected to data network 150 and management network 130. Data network 150 and management network 130 are also referred to as physical or "underlay" networks, and may be separate physical networks or the same physical network as discussed. As used herein, the term "underlay" may be synonymous with "physical" and refers to physical components of networking environment 100. As used herein, the term "overlay" may be used synonymously with "logical" and refers to the logical network implemented at least partially within networking environment 100.

Host(s) 110 may be geographically co-located servers on the same rack or on different racks in any arbitrary location in the data center. Host(s) 110 are configured to provide a virtualization layer, also referred to as a hypervisor 120, that abstracts processor, memory, storage, and networking resources of a hardware platform 140 into multiple virtual computing instances (VCIs) 112 (only one shown).

Host(s) 110 may be constructed on a server grade hardware platform 140, such as an x86 architecture platform. Hardware platform 140 of a host 110 may include components of a computing device such as one or more processors (CPUs) 142, system memory 144, one or more network interfaces (e.g., PNICs 146), storage 148, and other components (not shown). A CPU 142 is configured to execute instructions, for example, executable instructions that perform one or more operations described herein and that may be stored in the memory and storage system. The network interface(s) enable host 110 to communicate with other devices via a physical network, such as management network 130 and data network 150.

Hypervisor 120 architecture may vary. Virtualization software can be installed as system level software directly on the server hardware (often referred to as "bare metal" installation) and be conceptually interposed between the physical hardware and the guest operating systems executing in the virtual machines. Alternatively, the virtualization software may conceptually run "on top of" a conventional host operating system in the server. In some implementations, hypervisor 120 may comprise system level software as well as a "Domain 0" or "Root Partition" virtual machine (not shown) which is a privileged machine that has access to the physical hardware resources of the host. In this implementation, one or more of a virtual switch, virtual router, virtual tunnel endpoint (VTEP), etc., along with hardware drivers, may reside in the privileged virtual machine.

Hypervisor 120 includes one or more virtual switches 124. A virtual switch 124 may be a standard virtual switch. Standard virtual switches are default switches attached to a default port group defined by network manager 106 and provide network connectivity to a host 110 and VCIs 112 on the host. Port groups include subsets of virtual ports of a virtual switch, each port group having a set of logical rules allowing a policy to be configured for the port group. Network manager 106 configures and maintains each standard virtual switch individually for hosts 110. A virtual switch 124 has a virtual switch profile. The virtual switch profile includes a name of the virtual switch, a manufacturer, a version, a number of uplinks, a NIOC, a maximum transmission unit (MTU) size, a multicast filtering mode, a discovery type and operation status, and/or administrator contact information.

A virtual switch 124 may be a virtual distributed switch (VDS). In this case, each host 110 may implement a separate virtual switch corresponding to the VDS, but the virtual switches at each host may be managed like a single virtual switch across the hosts 110. A virtual switch such as a VDS can have multiple Layer 2 (L2) networking configuration profiles. An L2 networking configuration profile includes configuration details for logical switches and logical ports. For example, an L2 networking configuration profile can include a Quality-of-Service (QoS) profile, an IP address discovery profile, a security profile, and a medium access control (MAC) management profile. An L2 networking configuration profile can be used to provide high-quality and dedicated network performance for preferred traffic that requires a high bandwidth and high QoS and for allocating network bandwidth to business-critical applications.

Each of VCIs 112 running on host 110 may include virtual network interface card(s) (VNIC), such as VNIC(s) 113, which is responsible for exchanging packets between VCI 112 and hypervisor 120. A VNIC 113 may be referred to as a virtual interface (VIF), and each VNIC 113 may be associated with a VIF identifier, which may be a universally unique identifier (UUID). VNICs 113 can connect to VCI(s) 112 to virtual ports, such as Vport(s) 122, provided by virtual switch 124. Virtual switch 124 also has Vport(s) 125 connected to PNIC(s) 146, such as to allow VCIs 112 to communicate with virtual or physical computing devices outside of host 110 via data network 150 and/or management network 130. Vport(s) 125 may also be associated with VIF identifiers that are used by certain components to identify the ports.

Data center 102 includes a management plane and a control plane. Although illustrated within data center 102, it is also possible to deploy a centralized control plane in a cloud-based environment (not shown). The management plane and control plane each may be implemented as single entities (e.g., applications running on a physical or virtual compute instance), or as distributed or clustered applications or components. In alternative embodiments, a combined manager/controller application, server cluster, or distributed application, may implement both management and control functions. In the embodiment shown, network manager 106 at least in part implements the management plane and controller 104 at least in part implements the control plane The control plane determines the logical overlay network topology and maintains information about network entities such as logical switches, logical routers, and endpoints, etc. The logical topology information is translated by the control plane into network configuration data that is then communicated to network elements of host(s) 110. Controller 104 generally represents a control plane that manages configuration of VCIs 112 within the data center. Controller 104 may be one of multiple controllers executing on various hosts in the data center that together implement the functions of the control plane in a distributed manner. Controller 104 may be a computer program that resides and executes in a server in the data center 102, external to data center 102 (e.g., such as in a public cloud), or, alternatively, controller 104 may run as a virtual appliance (e.g., a VM) in one of hosts 110. Although shown as a single unit, it should be understood that controller 104 may be implemented as a distributed or clustered system. That is, controller 104 may include multiple servers or virtual computing instances that implement controller functions. It is also possible for controller 104 and network manager 106 to be combined into a single controller/manager. Controller 104 collects and distributes information about the network from and to endpoints in the network. Controller 104 is associated with one or more virtual and/or physical CPUs (not shown). Processor(s) resources allotted or assigned to controller 104 may be unique to controller 104, or may be shared with other components of the data center. Controller 104 communicates with hosts 110 via management network 130, such as through control plane protocols. In some embodiments, controller 104 implements a central control plane (CCP).

Network manager 106 and virtualization manager 108 generally represent components of a management plane comprising one or more computing devices responsible for receiving logical network configuration inputs, such as from a user or network administrator, defining one or more endpoints (e.g., VCIs) and the connections between the endpoints, as well as rules governing communications between various endpoints.

In some embodiments, network manager 106 is a computer program that executes in a server in networking environment 100, or alternatively, network manager 106 may run in a VM, e.g., in one of hosts 110. Network manager 106 may also be implemented as a cloud-based manager connected to an external network (not shown) via a WAN and communicating to controller 104, hosts 110, etc. via a gateway (not shown). Network manager 106 communicates with host(s) 110 via management network 130. Network manager 106 may receive network configuration input from a user or an administrator and generates desired state data that specifies how a logical network should be implemented in the physical infrastructure of the data center. Network manager 106 is configured to receive inputs from an administrator or other entity, e.g., via a web interface or application programming interface (API), and carry out administrative tasks for the data center, including centralized network management and providing an aggregated system view for a user.

In some embodiments, virtualization manager 108 is a computer program that executes in a server in data center 102 (e.g., the same or a different server than the server on which network manager 106 executes), or alternatively, virtualization manager 108 runs in one of VCIs 112. Like network manager 106, virtualization manager 108 may also be cloud-based and reside in an external network (not shown). Virtualization manager 108 is configured to carry out administrative tasks for the data center, including managing hosts 110, managing VCIs running within each host 110, provisioning VCIs, transferring VCIs from one host to another host, transferring VCIs between data centers, transferring application instances between VCIs or between hosts 110, and load balancing among hosts 110 within the data center. Virtualization manager 108 takes commands as to creation, migration, and deletion decisions of VCIs and application instances on the data center. However, virtualization manager 108 also makes independent decisions on management of local VCIs and application instances, such as placement of VCIs and application instances between hosts 110. In some embodiments, virtualization manager 108 also includes a migration component that performs migration of VCIs between hosts 110, such as by live migration. Live migration generally refers to migration of a VCI without shutting down and restarting the VCI.

Virtualization manager 108 comprises a cache 118, which is used to store information related to logical and virtual ports received from network manager 106 and/or, in some embodiments, controller 104. As described in more detail below with respect to FIG. 4, network manager 106 may send static port information such as port identifiers of logical ports and VIF identifiers of the logical ports (and/or, in some embodiments, VIF identifiers of VNICs associated with the logical ports) to virtualization manager 108 (e.g., when logical ports and VCIs are created and/or when the port information is updated), and virtualization manager 108 may store the received static port information in cache 118 for use in migrating VCIs 112 between hosts 110 when network manager 106 and/or controller 104 are unavailable. For example, virtualization manager 108 may use information stored in cache 118 to determine which logical ports a VCI 112 to be migrated is connected to and which virtual ports 122 implement those logical ports so that applicable virtual ports 122 can be cleaned up on the source host 110 and the VCI 112 can be connected to applicable virtual ports 122 on the destination host 110.

Figure 2:
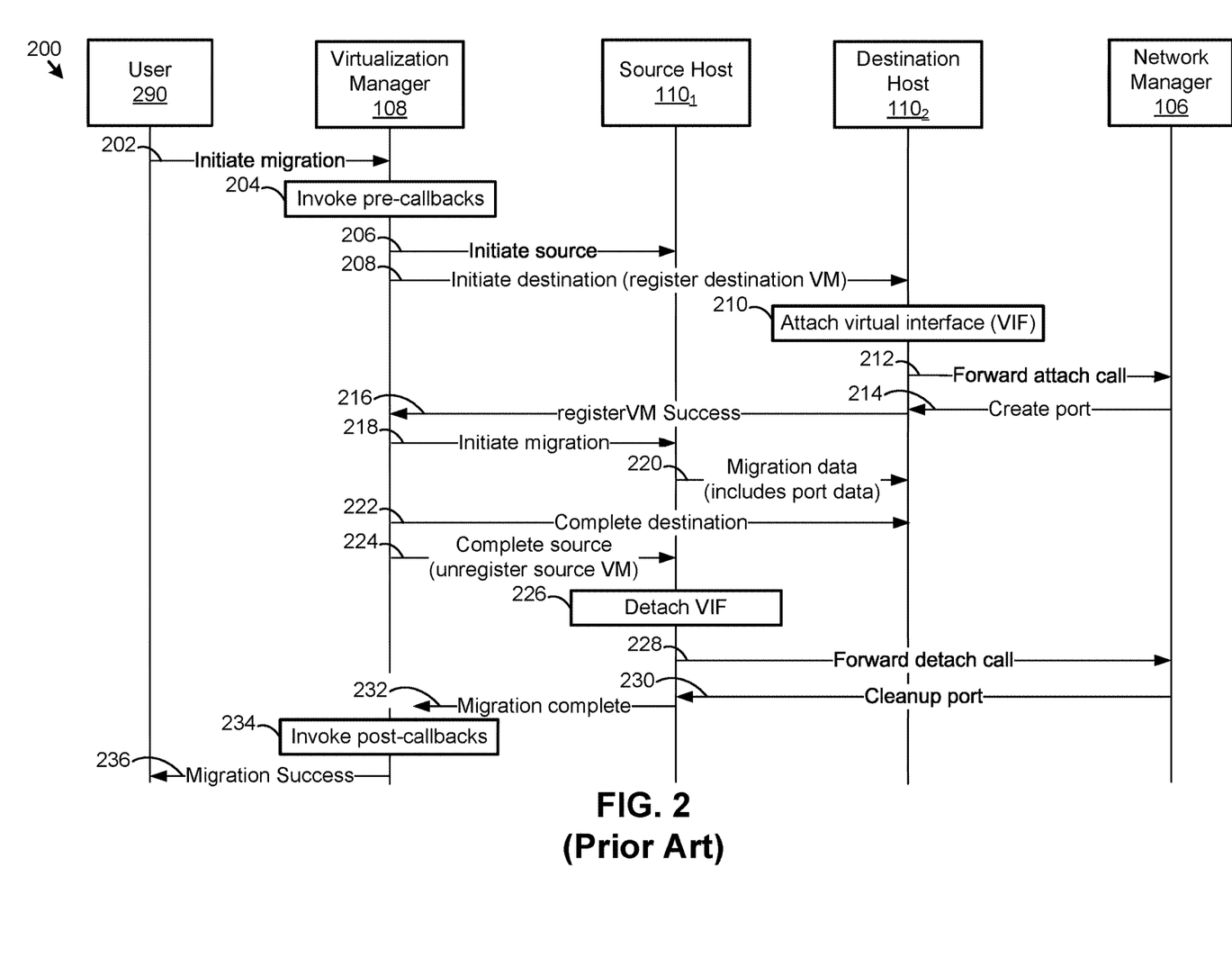
FIG. 2 depicts an example call flow related to a prior art technique for virtual computing instance (VCI) migration, according to one or more embodiments.

FIG. 2 depicts an example call flow 200 related to a prior art technique for virtual computing instance (VCI) migration, according to one or more embodiments.

Call flow 200 includes virtualization manager 108 and network manager 106 of FIG. 1, and source host $110_1$ and destination host $110_2$ are examples of hosts 110 of FIG. 1. Call flow 200 also includes a user 290, representing a user that provides input to virtualization manager 108 to configure virtual components.

At step 202, user 290 provides input to virtualization manager 108 to initiate migration of a VCI from source host $110_1$ to destination host $110_2$. For example, the migration may be a live migration.

At step 204, virtualization manager 108 invokes pre-callbacks, which represent logic to be performed prior to performing a migration. The pre-callbacks include steps 206 and 208, by which virtualization manager 108 prepares the source and destination hosts for the migration. Initiating the source host (step 206) generally involves notifying source host $110_1$ that a particular VCI is to be migrated. Imitating the destination host (step 208) generally involves registering the VCI that is to be migrated on destination host $110_2$, which prompts a component (referred to as "hostd") on destination host $110_2$ to make an attach VIF call at step 210 to an agent (e.g., referred to as an operations agent) of network manager 106 that is running on destination host $110_2$. The hostd component is an application that is responsible for managing many operations on a host computer, such as creation, powering on, and placement of VCIs. The operations agent functions as an agent of network manager 106 on the host, such as performing network management functionality.

At step 212, destination host $110_2$ (e.g., the operations agent) forwards the attach VIF call to network manager 106. At step 214, network manager 106 provides information for use in creating a virtual port on destination host $110_2$ based on the attach VIF call. For example, network manager 106 may send a port identifier of a logical port, a VIF identifier of the logical port, and/or a VIF identifier of a VNIC of the VCI to destination host $110_2$, and this information may be used to create a virtual port on destination host $110_2$ to which the VCI can be connected. Information provided by network manager 106 at step 214 may, in some embodiments, further include dynamic port information such as runtime state information of the logical port for use in configuring the virtual port on destination host $110_2$.

At step 216, destination host $110_2$ sends a confirmation to virtualization manager 108 that the VCI was successfully registered on destination host $110_2$. Upon receiving the confirmation, virtualization manager 108 initiates the migration of the VCI at step 218, such as sending instructions to source host $110_1$ to initiate the migration. At step 220, source host $110_1$ sends migration data (including, in some embodiments, dynamic port data such as the runtime state of the virtual port to which the VCI is connected) to destination host $110_2$. The migration data generally includes information that allows the VCI to be started on destination host $110_2$.

At step 222, virtualization manager 108 sends a message to destination host $110_2$ to complete the migration process on destination host $110_2$, such as powering on the VCI that has been migrated and connected to the newly created virtual port on destination host $110_2$. At step 224, virtualization manager 108 sends a message to source host $110_1$ to complete the migration process on source host $110_1$, such as deleting data related to the VCI that has been migrated. At step 226, source host $110_1$ issues a detach VIF call (e.g., which may be sent from a hostd component to an operations agent on source host $110_1$), and forwards the detach call to network manager 106 at step 228 (e.g., the operations agent may forward the detach VIF call to network manager 106).

At step 230, network manager 106 send information to source host $110_1$ for use in cleaning up the virtual port to which the migrated VCI was previously connected (e.g., the port identifier and the VIF identifier), and source host $110_1$ cleans up the port (e.g., deletes information related to the port) accordingly. At step 234, virtualization manager 108 invokes post-callbacks, which represent logic to be performed after a migration is complete. The post-callbacks include notifying user 290 that the migration was successfully completed.

It is noted that communications between network manager 106 and hosts such as source host $110_1$ and destination host $110_2$ are generally facilitated by the central control plane (e.g., controller 104 of FIG. 1). For example, when a host 110 communicates with network manager 106, a local controller on the host 110 may send messages to controller 105 of FIG. 1 and controller 105 of FIG. 1 may send messages to network manager 106 (and the process may be reversed for communications from network manager 106 to a host 110). Thus, when either the central control plane or network manager 106 are unavailable (e.g., due to a failure), the prior art migration process depicted in FIG. 2 cannot be performed. Without the ability to migrate VCIs, it is not possible to place hosts in maintenance mode or to attain the various benefits provided by migration, such as load balancing and performance optimization.

Figure 3:
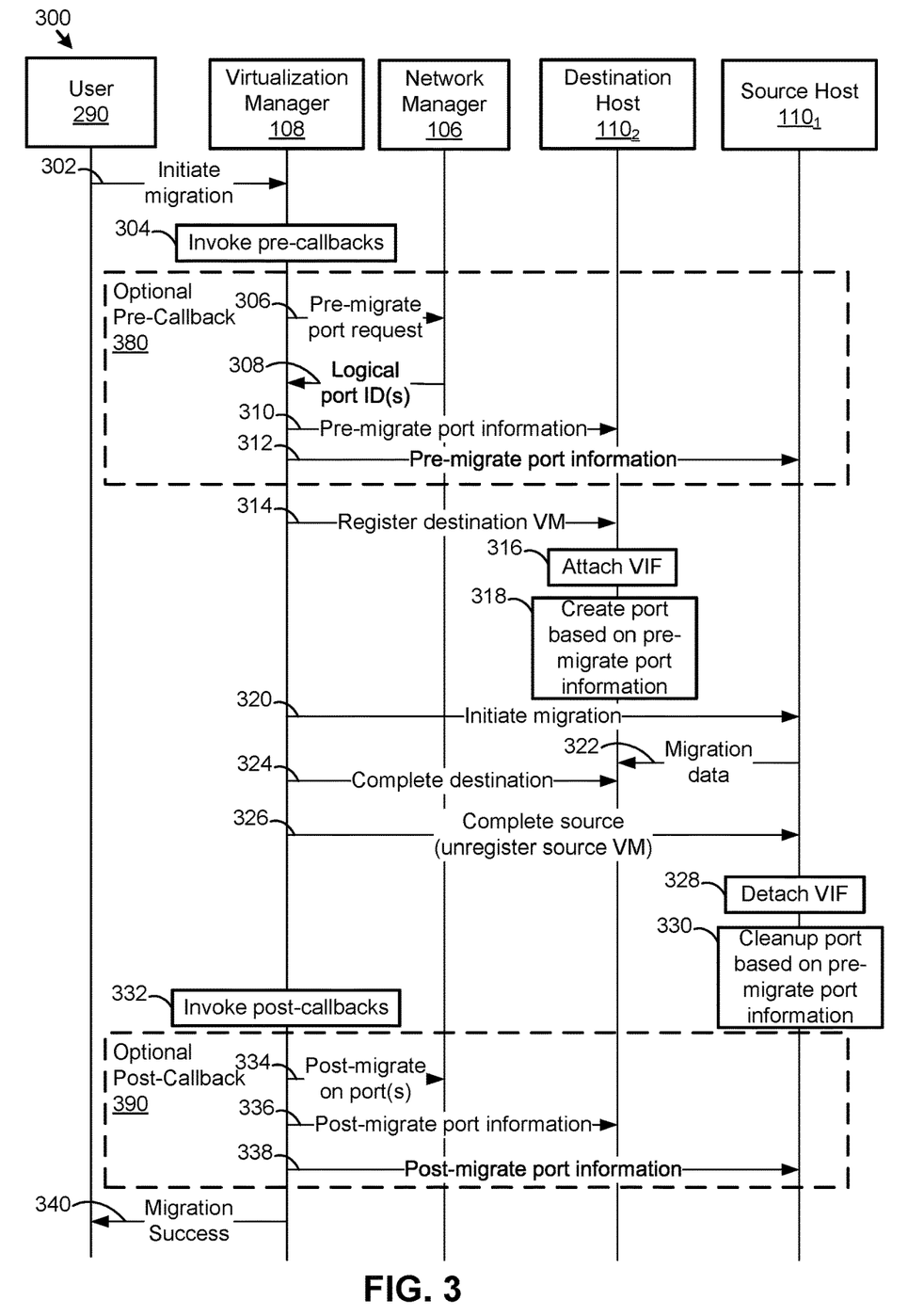
FIG. 3 depicts an example call flow related to virtual computing instance (VCI) migration when a network manager or central controller is available to assist with caching of information for use in VCI migration when the network manager or central controller is unavailable, according to one or more embodiments.

FIG. 3 depicts an example call flow 300 related to enabling virtual computing instance (VCI) migration when a network manager or central controller is available to assist with caching of information for use in VCI migration when the network manager or central controller is unavailable, according to one or more embodiments. Call flow 300 includes user 290, virtualization manager 108, network manager 106, destination host $110_2$ and source host $110_1$ of FIG. 2. The migration process depicted in call flow 300 moves the involvement of network manager 106 (and, consequently the central control plane) into the pre-callbacks and post-callbacks, which are existing aspects of the migration process, so that network manager 106 and the central control plane are not in the critical path of the migration process.

At step 302, user 290 provides input to virtualization manager 108 to initiate migration of a VCI from source host $110_1$ to destination host $110_2$. For example, the migration may be a live migration.

At step 304, virtualization manager 108 invokes pre-callbacks, which represent logic to be performed prior to performing a migration. The pre-callbacks include optional pre-callback 380, comprising steps 306, 308, 310, and 312. Optional pre-callback 380 may be performed in cases where network manager 106 is available, but may be skipped or delayed in cases where the network manager 106 is unavailable, such as due to a failure of network manager 106 and/or the central controller.

At step 306, virtualization manager 108 requests, from network manager 106, port information related to the migration. The request may identify the VCI that is to be migrated. At step 308, network manager 106 sends port information to virtualization manager 108 in response to the request. For example, the port information may comprise a port identifier and/or a VIF identifier of a logical port to which the VCI is connected. The port information may further comprise a VIF identifier of a VNIC of the VCI that is connected to the logical port. While certain embodiments are described with respect to a single port, port information of multiple ports may be sent as applicable.

As described in more detail below with respect to FIG. 4, virtualization manager 108 may store the port information received from network manager 106, such as in a cache. While call flow 300 depicts network manager 106 providing port information to virtualization manager 108 as part of pre-callbacks for a migration operation, network manager 106 may provide port information to virtualization manager 108 at other times, such as when VCIs are attached to ports and/or when port information changes, and virtualization manager 108 may store the port information and/or update previously-stored port information whenever it is received.

At step 310, virtualization manager 108 provides pre-migrate port information to destination host $110_2$ and, at step 312, virtualization manager 108 provides pre-migrate port information to source host $110_1$. The pre-migrate information provides at steps 310 and 312 may include the port identifier and the VIF identifier. The pre-migrate port information may be stored by source host $110_1$ and destination host $110_2$ (e.g., at respective hostd components) for use in cleaning up a virtual port on source host $110_1$ (e.g., which may be done when a detach VIF call is issued) and creating a corresponding virtual port on destination host $110_2$ (e.g., which may be done when an attach VIF call is issued).

At step 314, after the pre-callbacks, virtualization manager 108 sends a message to destination host $110_2$ to register the VCI that is to be migrated. The message from virtualization manager 108 prompts the hostd component on destination host $110_2$ to make an attach VIF call at step 316 to the operations agent on destination host $110_2$. The operations agent determines that the attach VIF call corresponds to the pre-migrate port information sent to destination host $110_2$ by virtualization manager 108 at step 310, and that communication with network manager 106 is therefore not needed. Thus, at step 318, destination host $110_2$ creates a port (e.g., a virtual port) based on the pre-migrate port information. For example, destination host $110_2$ may create a virtual port that implements the logical port identified by the pre-migrate port information. The VCI is connected to the newly created port via a VNIC of the VCI.

At step 320, virtualization manager 108 initiates the migration of the VCI, such as sending instructions to source host $110_1$ to initiate the migration. At step 322, source host $110_1$ sends migration data (including, in some embodiments, dynamic port data such as the runtime state of the virtual port to which the VCI is connected) to destination host $110_2$. The migration data generally includes information that allows the VCI to be started on destination host $110_2$. Dynamic port data received from source host $110_1$ may be applied to the newly created virtual port on destination host $110_2$.

At step 324, virtualization manager 108 sends a message to destination host $110_2$ to complete the migration process on destination host $110_2$, such as powering on the VCI that has been migrated and connected to the newly created virtual port on destination host $110_2$. At step 326, virtualization manager 108 sends a message to source host $110_1$ to complete the migration process on source host $110_1$, such as deleting data related to the VCI that has been migrated. At step 328, source host $110_1$ issues a detach VIF call (e.g., which may be sent from a hostd component to an operations agent on source host $110_1$). The operations agent may determine that the detach VIF call corresponds to the pre-migrate port information sent by virtualization manager 108 at step 312, and cleans up the virtual port accordingly. For example, source host $110_1$ may delete information related to the virtual port identified by the pre-migrate port information.

At step 332, virtualization manager 108 invokes post-callbacks, comprising optional post-callback 390, which includes steps 334, 336, and 338. Optional post-callback may be performed in cases where network manager 106 is available, but may be skipped or delayed in cases where the network manager 106 is unavailable, such as due to a failure of network manager 106 and/or the central controller.

At step 334, virtualization manager 108 sends post-migrate information relating to any ports affected by the migration operation. The post-migrate information may include information relating to the newly created virtual port on destination host $110_2$ and the cleaned up virtual port on source host $110_1$. In some embodiments, network manager 106 may respond to the post-migrate information with any updates to the static port information that have occurred since the static port information was last sent by network manager 106 to virtualization manager 108, or may respond with all configuration information for the logical port. At step 336, virtualization manager 108 sends post-migrate port information to destination host $110_2$ and then, at step 338, virtualization manager 108 sends post-migrate port information to source host $110_1$. The post-migrate port information sent at steps 336 and 338 may include any changes to the static port information that occurred since the static port information was last sent by network manager 106 to virtualization manager 108. In some embodiments, the post-migrate port information comprises all configuration information for the logical port that is maintained by network manager 106, and the configuration of the logical port is re-applied on destination host $110_2$.

At step 340, virtualization manager 108 notifies the user 290 that the migration was successfully completed.

Notably, by moving the involvement of the network manager 106 (and the central controller) into optional pre-callback 380 and optional post-callback 390, embodiments of the present disclosure allow a live migration to be performed even in cases where network manager 106 and/or the central controller are unavailable. For example, by storing static port information in a cache a virtualization manager 108, techniques described herein allow virtual ports to be cleaned up on source hosts and created on destination hosts in connection with performing a migration operation without the direct involvement of the network manager 106.

Figure 4:
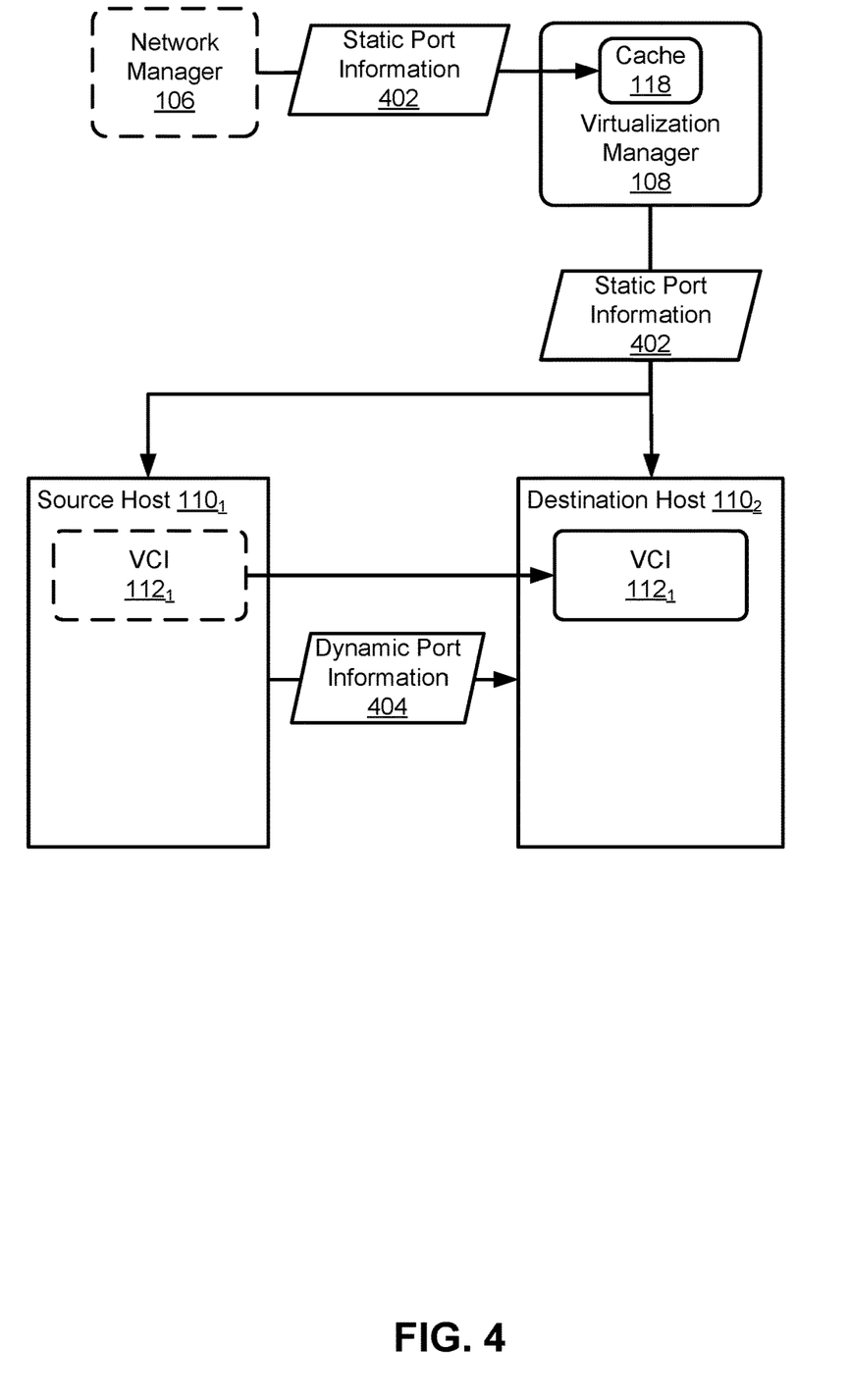
FIG. 4 depicts an example of migrating a VCI when a network manager or central controller is unavailable, according to one or more embodiments.

FIG. 4 depicts an example of migrating a VCI when a network manager or central controller is unavailable, according to one or more embodiments. FIG. 4 includes network manager 106, virtualization manager 108, source host $110_1$, and destination host $110_2$ of FIGS. 2 and 3, and cache 118 of FIG. 1.

Network manager 108 sends static port information 402 to virtualization manager 108, and static port information 402 is stored in cache 118 on virtualization manager 108. Static port information 402 generally comprises a port identifier and/or a VIF identifier of a logical port and, in some embodiments, a VIF identifier of a VNIC of a VCI that is attached to the logical port. In some cases, static port information 402 further comprises identifiers of one or more VCIs attached to the logical port, an identifier of the host on which the logical port is currently implemented, an amount of storage being utilized by the logical port on the host, identifiers of one or more hosts on which a logical switch of which the logical port is a component is currently implemented, an amount of storage being utilized by the logical switch on the one or more hosts, and/or the like. For example, static port information 402 may be sent to virtualization manager 108 at a time when the logical port is created, when a VCI is attached to the logical port, when the static port information is updated, and/or as part of a pre-callback (e.g., optional pre-callback 380 of FIG. 3). Once static port information 402 is stored in cache 118, it can be used to perform a live migration of a VCI even if network manager 106 is unavailable. It is noted that aspects of the present disclosure described with respect to network manager 106 may alternatively or additionally apply to a central controller (e.g., controller 104 of FIG. 1) that is configured to push logical configuration information to hosts based on inputs provided by a user to network manager 106. For example, static port information may be maintained by the central controller and sent to virtualization manager 108 from the central controller for use in cases where the central controller and/or network manager 106 are unavailable.

In an example, a migration operation is requested by which VCI $112_1$ is to be migrated from source host $110_1$ to destination host $110_2$. Network manager 106 may be unavailable at the time the migration operation is requested, as indicated by network manager 106 being shown in broken lines.

Virtualization manager 108 sends static port information 402 to source host $110_1$ and destination host $110_2$, such as prior to performing a migration operation (e.g., as part of a pre-callback such as optional pre-callback 380 of FIG. 3).

In some embodiments, virtualization manager 108 only sends static port information 402 to source host $110_1$ and destination host $110_2$ in cases where network manager 106 is unavailable at the time of migration (e.g., and network manager 106 itself sends static port information 402 via the central controller to source host $110_1$ and destination host $110_2$ when network manager 106 is available), while in other embodiments virtualization manager 108 sends static port information 402 to source host $110_1$ and destination host $110_2$ regardless of whether network manager 106 is available.

Source host $110_1$ sends dynamic port information 404 to destination host $110_2$. Dynamic port information 404 generally includes runtime state of the logical port. For example, dynamic port information 404 may include indications of whether a virtual port implementing the logical port is up or down, whether the logical port is blocked, and/or the like.

A virtual port that implements the logical port identified by static port information 402 is created on destination host $110_2$ and is configured based on static port information 402 and dynamic port information 404. VCI $112_1$ is attached to the created virtual port on destination host $110_2$, and is powered on.

If the migration is performed while network manager 106 is unavailable and network manager 106 subsequently becomes available, a re-synchronization of logical port configuration information may be performed between network manager 106 and each of source host $110_1$ and destination host $110_2$. For example, upon reconnecting, network manager 106 may query each of source host $110_1$ and destination host $110_2$ to determine which logical ports are currently implemented on each, and network manager may send configuration information for all applicable logical ports to each of source host $110_1$ and destination host $110_2$. The received configuration information may be re-applied on each of source host $110_1$ and destination host $110_2$ accordingly. Thus, any change to configuration of logical ports that occurred during the migration will be applied on source host $110_1$ and destination host $110_2$.

It is noted that techniques described herein for caching logical port data at virtualization manager 108 can also be applied to other entities such as VCI groups, firewalls routers, and the like. For example, data related to these other entities may similarly be sent from network manager 106 and/or a central controller to virtualization manager 108 and cached at virtualization manager 108 for use in performing operations such as live migration of VCIs when network manager 106 and/or the central controller are unavailable.

Figure 5:
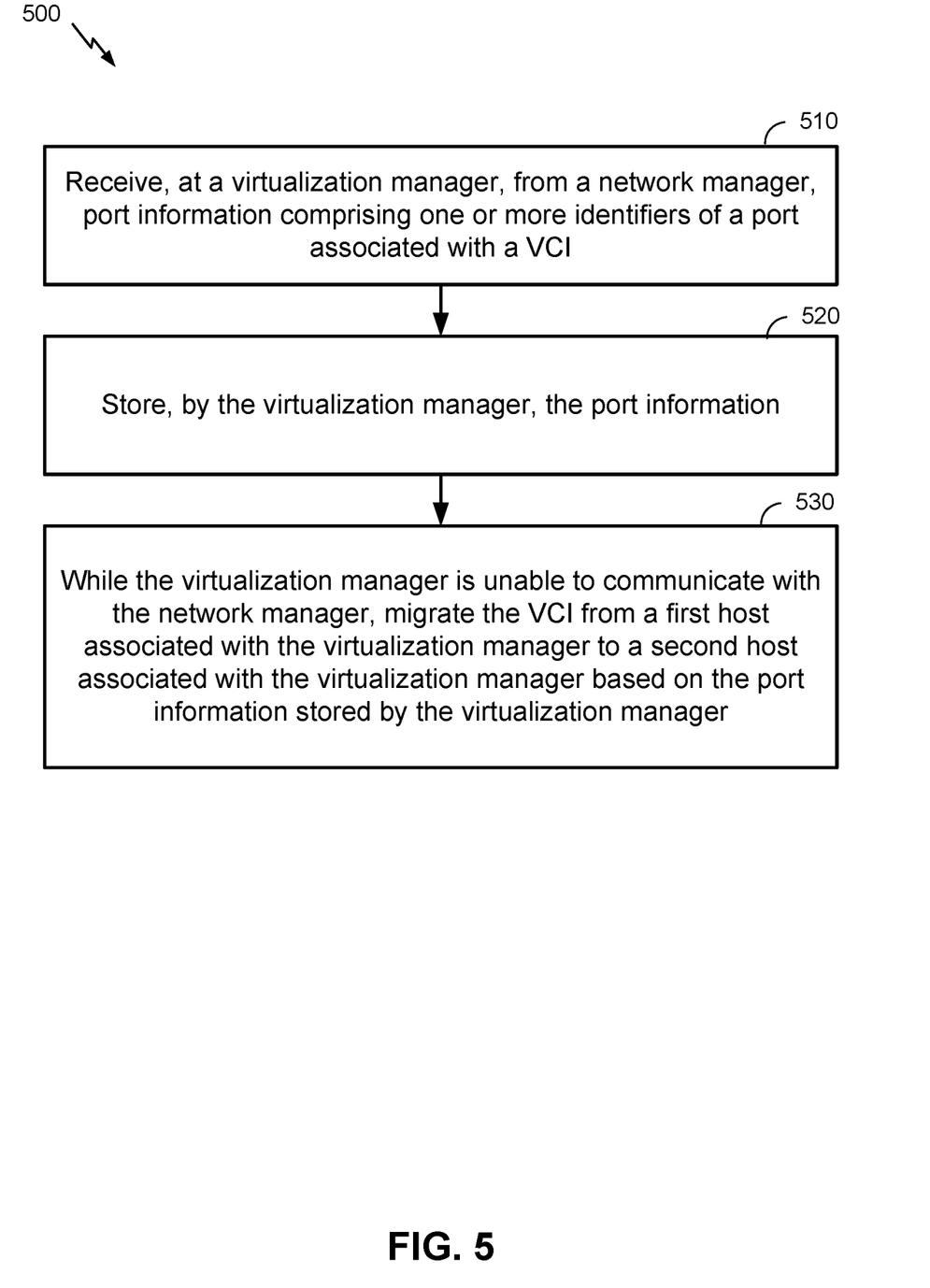
FIG. 5 depicts a flow diagram illustrating example operations for migrating a VCI when a network manager or central controller is unavailable, according to one or more embodiments.

FIG. 5 depicts example operations 500 for migrating a VCI when a network manager or central controller is unavailable, according to one or more embodiments. For example, operations 500 may be performed by virtualization manager 108 of FIGS. 1-4.

Operations 500 begin at step 510, with receiving, at a virtualization manager, from a network manager, port information comprising one or more identifiers of a port associated with a VCI. In certain embodiments, the one or more identifiers comprise a port identifier and a virtual interface (VIF) identifier of a logical port. In some embodiments, the network manager sends the port information to the virtualization manager when the VCI is attached to the port.

Operations 500 continue at step 520, with storing, by the virtualization manager, the port information. In some embodiments, the port information is stored in a cache at the virtualization manager.

Operations 500 continue at step 530, with, while the virtualization manager is unable to communicate with the network manager, migrating the VCI from a first host associated with the virtualization manager to a second host associated with the virtualization manager based on the port information stored by the virtualization manager.

In some embodiments, migrating the VCI from the first host to the second host is further based on transmitting runtime data of the virtual port from the first host to the second host.

Certain embodiments further comprise storing updated port information at the virtualization manager based on the migrating. For example, the updated port information may indicate that the virtual port is implemented on the second host, that the VCI is attached to the port on the second host, that a particular VNIC of the VCI is attached to the port on the second host, that the port is no longer implemented on the first host, and/or the like.

Some embodiments further comprise determining, by the virtualization manager, after the migrating, that the virtualization manager is able to communicate with the network manager, and sending, by the virtualization manager, information about the migrating to the network manager.

It should be understood that, for any process described herein, there may be additional or fewer steps performed in similar or alternative orders, or in parallel, within the scope of the various embodiments, consistent with the teachings herein, unless otherwise stated.

The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments may be useful machine operations. In addition, one or more embodiments also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system—level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. The term "virtualized computing instance" as used herein is meant to encompass both VMs and OS-less containers.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method of virtual computing instance (VCI) migration, the method comprising:
receiving, at a virtualization manager, from a network manager, port information comprising one or more identifiers of a port associated with a VCI;
storing, by the virtualization manager, the port information; and
migrating the VCI from a first host associated with the virtualization manager to a second host associated with the virtualization manager based on the port information stored by the virtualization manager, wherein the virtualization manager is unable to communicate with the network manager, and wherein the migrating occurs while the virtualization manager is unable to communicate with the network manager.

2. The method of claim 1, wherein migrating the VCI from the first host to the second host is further based on transmitting runtime data of the port from the first host to the second host.

3. The method of claim 1, wherein the port information is stored in a cache at the virtualization manager.

4. The method of claim 1, wherein the one or more identifiers comprise a port identifier and a virtual interface (VIF) identifier.

5. The method of claim 1, further comprising storing updated port information at the virtualization manager based on the migrating.

6. The method of claim 1, further comprising:
determining, by the virtualization manager, after the migrating, that the virtualization manager is able to communicate with the network manager; and
sending, by the virtualization manager, information about the migrating to the network manager.

7. The method of claim 1, wherein the network manager sends the port information to the virtualization manager when the VCI is attached to the port.

8. A system virtual computing instance (VCI) migration, the system comprising:
at least one memory; and
at least one processor coupled to the at least one memory, the at least one processor and the at least one memory configured to:
receive, at a virtualization manager, from a network manager, port information comprising one or more identifiers of a port associated with a VCI;
store, by the virtualization manager, the port information; and
while the virtualization manager is unable to communicate with the network manager, migrate the VCI from a first host associated with the virtualization manager to a second host associated with the virtualization manager based on the port information stored by the virtualization manager.

9. The system of claim 8, wherein migrating the VCI from the first host to the second host is further based on transmitting runtime data of the port from the first host to the second host.

10. The system of claim 8, wherein the port information is stored in a cache at the virtualization manager.

11. The system of claim 8, wherein the one or more identifiers comprise a port identifier and a virtual interface (VIF) identifier.

12. The system of claim 8, wherein the at least one processor and the at least one memory are further configured to store updated port information at the virtualization manager based on the migrating.

13. The system of claim 8, wherein the at least one processor and the at least one memory are further configured to:
determine, by the virtualization manager, after the migrating, that the virtualization manager is able to communicate with the network manager; and
send, by the virtualization manager, information about the migrating to the network manager.

14. The system of claim 8, wherein the network manager sends the port information to the virtualization manager when the VCI is attached to the port.

15. A non-transitory computer-readable medium storing instructions that, when executed by one or more processors, cause the one or more processors to:
receive, at a virtualization manager, from a network manager, port information comprising one or more identifiers of a port associated with a VCI;
store, by the virtualization manager, the port information; and
while the virtualization manager is unable to communicate with the network manager, migrate the VCI from a first host associated with the virtualization manager to a second host associated with the virtualization manager based on the port information stored by the virtualization manager.

16. The non-transitory computer-readable medium of claim 15, wherein migrating the VCI from the first host to the second host is further based on transmitting runtime data of the port from the first host to the second host.

17. The non-transitory computer-readable medium of claim 15, wherein the port information is stored in a cache at the virtualization manager.

18. The non-transitory computer-readable medium of claim 15, wherein the one or more identifiers comprise a port identifier and a virtual interface (VIF) identifier.

19. The non-transitory computer-readable medium of claim 15, wherein the instructions, when executed by one or more processors, further cause the one or more processors to store updated port information at the virtualization manager based on the migrating.

20. The non-transitory computer-readable medium of claim 15, wherein the instructions, when executed by one or more processors, further cause the one or more processors to:
- determine, by the virtualization manager, after the migrating, that the virtualization manager is able to communicate with the network manager; and
- send, by the virtualization manager, information about the migrating to the network manager.

\* \* \* \* \*